(12) United States Patent
Frank

(10) Patent No.: US 7,480,006 B1
(45) Date of Patent: Jan. 20, 2009

(54) OPTICAL PACKAGE FOR IMAGE SENSOR WITH INTEGRATED HEATER

(75) Inventor: Michael Frank, Sunnyvale, CA (US)

(73) Assignee: PIXIM, Inc., Mountain View, CA (US)

( * ) Notice: Subject to any disclaimer, the term of this patent is extended or adjusted under 35 U.S.C. 154(b) by 801 days.

(21) Appl. No.: 10/823,161

(22) Filed: Apr. 13, 2004

(51) Int. Cl.
*H04N 5/225* (2006.01)
*H01J 5/02* (2006.01)
*H01J 40/14* (2006.01)

(52) U.S. Cl. .................... 348/374; 250/239; 257/433
(58) Field of Classification Search ............. 348/374; 250/208.1, 239; 257/433
See application file for complete search history.

(56) References Cited

U.S. PATENT DOCUMENTS

| | | | | |
|---|---|---|---|---|
| 4,420,261 | A * | 12/1983 | Barlow et al. | 356/621 |
| 5,334,829 | A * | 8/1994 | Ueno et al. | 250/208.1 |
| 5,865,935 | A * | 2/1999 | Ozimek et al. | 156/303.1 |
| 5,938,956 | A * | 8/1999 | Hembree et al. | 219/209 |
| 6,023,091 | A * | 2/2000 | Koch et al. | 257/536 |
| 6,458,627 | B1 * | 10/2002 | Choi | 438/122 |
| 6,566,745 | B1 * | 5/2003 | Beyne et al. | 257/680 |
| 7,282,393 | B2 * | 10/2007 | Tarn | 438/116 |
| 2003/0089957 | A1 * | 5/2003 | Anton | 257/433 |
| 2003/0164365 | A1 * | 9/2003 | Ito et al. | 219/444.1 |
| 2004/0232535 | A1 * | 11/2004 | Tarn | 257/680 |

FOREIGN PATENT DOCUMENTS

WO      WO 02/056073 A1      7/2002

* cited by examiner

*Primary Examiner*—Ngoc-Yen T Vu
*Assistant Examiner*—Chia-Wei A Chen
(74) *Attorney, Agent, or Firm*—Patent Law Group LLP; Carmen C. Cook

(57) ABSTRACT

An integrated circuit package for an image sensor chip includes an integrated heater element. In one embodiment, the integrated circuit package includes a substrate including a first surface disposed to receive an image sensor chip and a second surface having an array of contact terminals formed thereon and a heater element. The heater element has a first terminal and a second terminal coupled to a first contact terminal and a second contact terminal. The heater element is positioned on the first surface of the substrate and underneath the sensor area of the image sensor chip to be assembled in the package. The heater element provides heating of the sensor area of the image sensor chip when a first voltage is applied across the first contact terminal and the second contact terminal. An ESD protection resistor can be coupled between the first terminal and the second terminal of the heater element.

13 Claims, 2 Drawing Sheets

OPTICAL PACKAGE FOR IMAGE SENSOR WITH INTEGRATED HEATER

FIELD OF THE INVENTION

The invention relates to an integrated circuit package for an image sensor and, in particular, to an integrated circuit package for an image sensor including an integrated heater for providing localized heating of the sensor area of the image sensor.

DESCRIPTION OF THE RELATED ART

Digital imaging devices, such as digital cameras or digital camcorder, use an image sensor to capture an image of a scene. The image sensor, which is a photosensitive device, reacts to light reflected from the scene and can translate the strength of that reaction into electronic charging signals that are subsequently digitized. The image sensor can be a charged-coupled device (CCD) or a Complementary Metal-Oxide Semiconductor (CMOS) device. CMOS image sensors have advantages over CCD devices by allowing integration of the image sensing component and the digital control and signal processing circuitry onto the same integrated circuit. Thus, an image sensor integrated circuit, or an image sensor chip, can be formed fabricated on a single substrate where the image sensor chip includes a two-dimensional array of photodetectors and also includes control and processing circuitry for accessing and processing the signals sensed by the array of photodetectors.

An image sensor chip often requires calibration to be performed to determine leaking currents or offset values which may adversely impact the quality of the detected signals. Often the calibration needs to be performed at room temperature and an elevated temperature (such as greater than 325 Kelvin). The elevated temperature calibration often has to be performed by heating the entire camera unit in a heat chamber during production. Relying on a heat chamber for elevated temperature calibration is undesirable as it increases the cost of manufacturing and the calibration cannot be done in the field but rather must be done at the manufacturing site.

Other approaches for providing field calibration are not satisfactory. For example, a heater may be added to the camera system in which the image sensor chip is incorporated. However, this approach requires extra space in the camera and does not assure uniform heating of the image sensor.

SUMMARY OF THE INVENTION

According to one embodiment of the present invention, an integrated circuit package for an image sensor chip includes an integrated heater element. Specifically, the image sensor chip to be assembled in the integrated circuit package includes a sensor area for sensing incident light and a circuitry area. The integrated circuit package includes a substrate including a first surface and a second surface and a heater element. The first surface of the substrate is disposed to receive an image sensor chip. The second surface of the substrate has an array of contact terminals formed thereon. The heater element has a first terminal and a second terminal coupled to a first contact terminal and a second contact terminal, respectively, of the array of contact terminals. The heater element is positioned on the first surface of the substrate and underneath the sensor area of the image sensor chip to be assembled in the package. The heater element provides heating of the sensor area of the image sensor chip when a first voltage is applied across the first contact terminal and the second contact terminal. In one embodiment, a protection resistor is coupled between the first terminal and the second terminal of the heater element.

In one embodiment, the image sensor chip is attached to the first surface of the substrate so that the heater element is sandwiched between the sensor area of the image sensor chip and the first surface of the substrate.

The present invention is better understood upon consideration of the detailed description below and the accompanying drawings.

DETAILED DESCRIPTION OF THE PREFERRED EMBODIMENTS

In accordance with the principles of the present invention, an integrated circuit package for an image sensor chip includes an integrated heater element in the package for providing heating of the image sensor chip. The heater element is formed on the surface of the package substrate and is sandwiched between the package substrate and the image sensor chip attached to the package substrate. By providing an integrated heater element in the integrated circuit package, the heater element can be positioned close to the image sensor chip and directly below the active sensing area so as to provide localized heating of the sensing area of the image sensor chip.

The image sensor integrated circuit package of the present invention including an integrated heater element provides many advantages over conventional methods for heating an image sensor chip. First, by positioning the heater element in close proximity to and directly below the sensing area of the image sensor chip, the heat can be applied directly to the critical area of the image sensor chip. Second, the heat transfer can be very efficient as the heater element is in close proximity to the target. Thus, the power requirement of the heater element is reduced. Third, the heater element can be formed as a resistive heater device for providing uniform heating across the entire region of interest.

Figure 1:
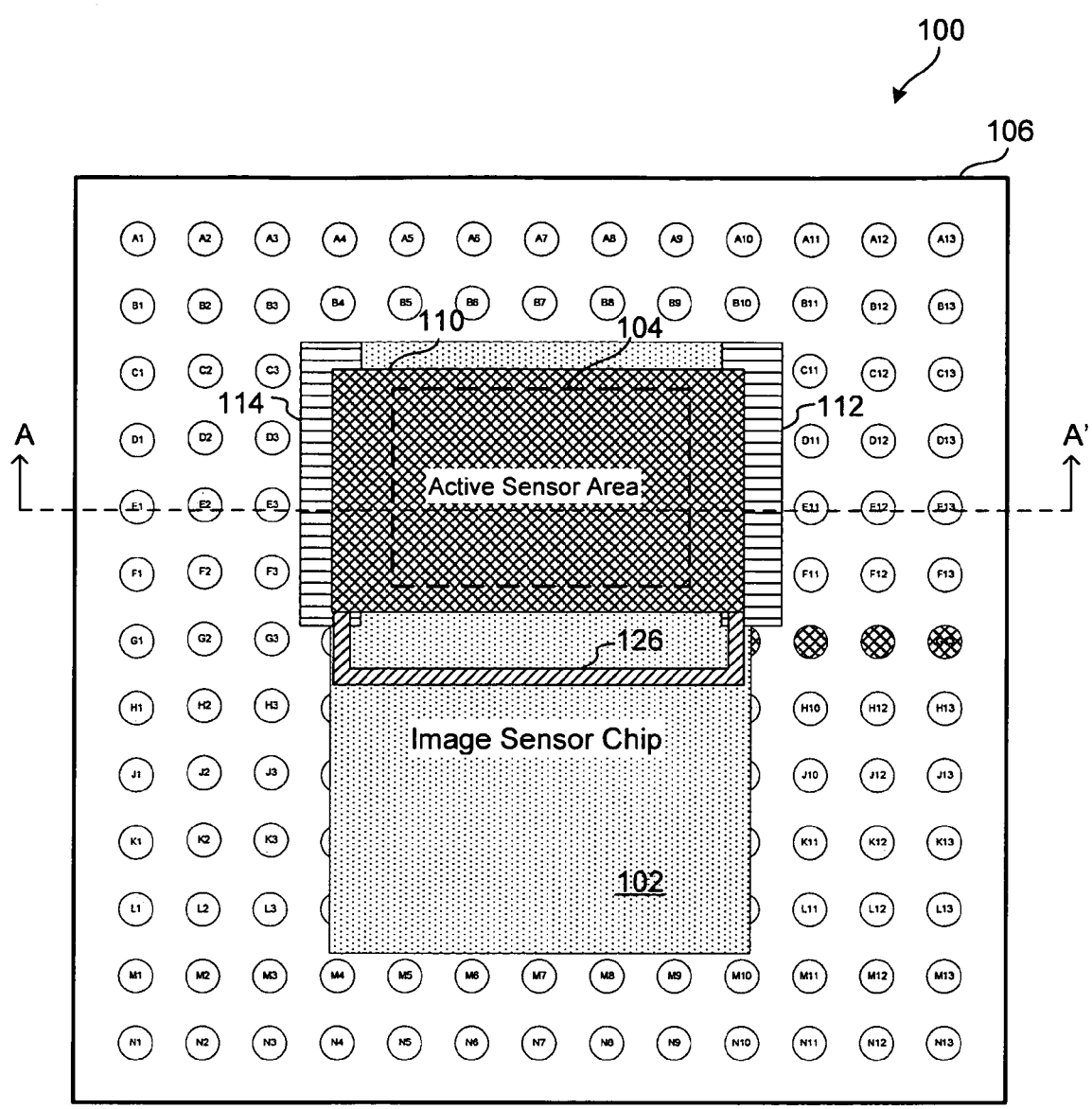
FIG. 1 is a pictorial representation of an image sensor integrated circuit package according to one embodiment of the present invention.
Figure 2:
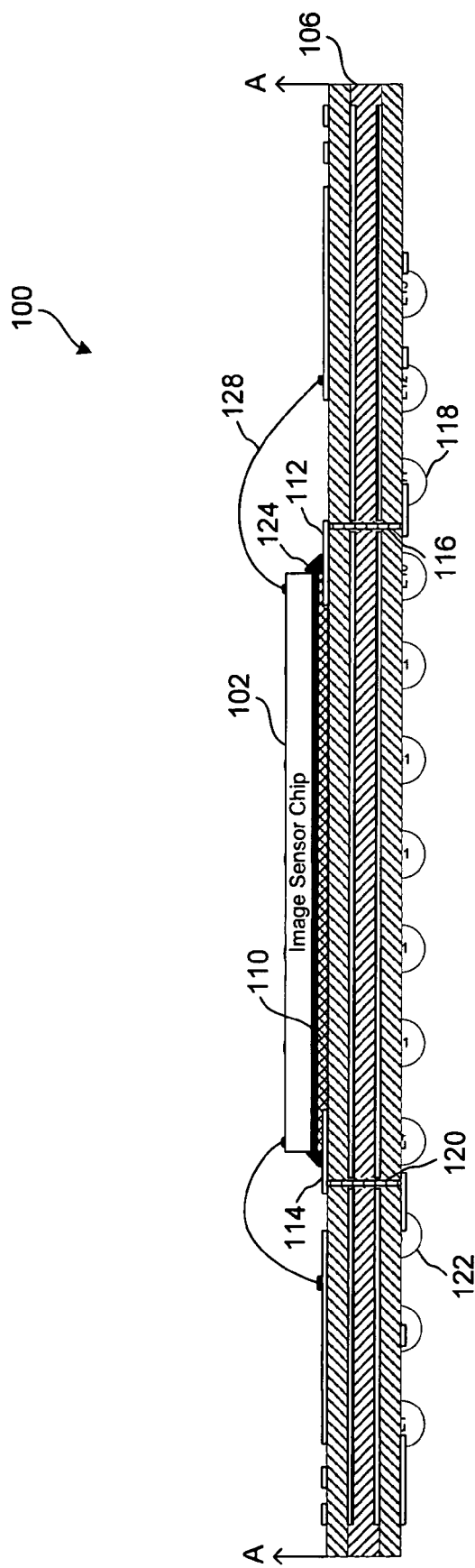
FIG. 2 is a cross-sectional view of the image sensor integrated circuit package of FIG. 1 along a line A-A'.

FIG. 1 is a pictorial representation of an image sensor integrated circuit package according to one embodiment of the present invention. FIG. 2 is a cross-sectional view of the image sensor integrated circuit package of FIG. 1 along a line A-A'. Referring to FIGS. 1 and 2, an image sensor integrated circuit package 100 is implemented as a ball grid array package in the present embodiment. A ball grid array (BGA) package is commonly used when the integrated circuit encapsulated in the package has a large pin count, that is, a large number of input/output (I/O) pins. The use of a BGA package for implementing the image sensor integrated circuit package of the present invention is illustrative only. The image sensor integrated circuit package of the present invention can be implemented using any other package types suitable for accommodating an image sensor chip. For example, the image sensor integrated circuit package of the present invention can be formed as a land grid array package (LGA), a pin grid array package (PGA), a ceramic leaded chip carrier package (CLCC) and a plastic leaded chip carrier package (PLCC).

Image sensor integrated circuit package 100 (herein after "package 100") includes a substrate 106 having a first surface and an opposing second surface. In the present embodiment, an image sensor chip 102 is placed on the first surface (the top surface) of package 100 while an array of contact balls is formed on the second surface (the bottom surface) of package 100. FIG. 1 is a schematic diagram for illustrating pictorially the layers forming package 100 from the bottom surface where the array of contacts balls is formed. FIG. 1 is not intended to be an actual structural depiction of package 100 as viewed from the bottom surface.

In the present embodiment, substrate 106 of package 100 is a multi-layer PC board. Referring to FIGS. 1 and 2, package 100 includes an integrated heater element 110 formed on the first (top) surface of substrate 106. In the present embodiment, heater element 110 is a resistive heater including a first terminal 112 and a second terminal 114. First terminal 112 of resistive heater 110 is connected to a first contact ball of package 100. For instance, first terminal 112 can be connected through a via interconnect 116 to a contact ball 118. Second terminal 114 of resistive heater 110 is connected to a second contact ball of package 100. For instance, second terminal 114 can be connected through a via interconnect 120 to a contact ball 122. When a voltage is applied across first terminal 112 and second terminal 114, heater element 110 will heat up to provide the desired heating. In one embodiment, first terminal 112 of heater element 110 is connected to a power supply voltage, such as the ground voltage. Thus, a voltage is applied to second terminal 114 to increase the temperature of the heater element.

In the present embodiment, package 100 further includes a resistor 126 connected between first terminal 112 and second terminal 114 of heater element 110. Resistor 126 functions as an ESD protection resistor and is typically a high resistance resistor, such as having a resistance of 100 Ohms or greater. Resistor 126 operates to short out resistive heater 110 when the heater element is not in used to provide ESD protection. Basically, when heater element 110 is not to be activated, one of contact balls 118 and 122 can be left floating while the other contact ball is connected to the ground potential. Resistor 126 is an optional element of package 100 and may be omitted in other embodiments of the integrated circuit package of the present invention.

When package 100 is used to assemble an image sensor integrated circuit, an image sensor chip 102 is attached to the first (top) surface of substrate 106, such as by use of an epoxy glue 124. Wire bonds 128 can be used to connect the input/output pads of image sensor chip 102 to connect terminals of package 100 on substrate 106. The package can then be encapsulated. Typically, a transparent cover, such as a glass cover, is provided above the active sensor area to form a window to allow at least the sensor area of image sensor chip 104 to be exposed for sensing incident light or radiation.

In accordance with the present invention, heater element 110 is positioned underneath the sensor area of the image sensor chip so that direct and localized heating of the sensor area is realized. Referring to FIG. 1, image sensor chip 102 is an integrated circuit including an active sensor area 104 and a circuitry area. More specifically, active sensor area 104 is the area of the image sensor chip where the two dimensional array of photosensitive elements are formed for sensing incident light. The remaining area of the image sensor chip is the circuitry area for containing the control circuits and/or the signal processing circuits of the image sensor chip. Heater element 110 is positioned directly below active sensor area 104 of image sensor chip 102 so that localized heating of the active sensor area is provided when the heater element is activated.

In operation, when heater element 110 is to be activated, a voltage is applied across first terminal 112 and second terminal 114 of heater element 110. When first terminal 112 is connected to the ground voltage, a voltage can be applied to second terminal 114 for activating the heater element. The voltage can be on the order of a few volts. A specific voltage value is selected to obtain the desired temperature output from the heater element.

In one embodiment, resistive heater 110 is made using conductive plastic. Heater element 110 can be formed by applying a silk screen printing process which is part of the standard workflow of PC board manufacturing. In another embodiment, package 100 is a ceramic package and resistive heater 110 is made using tungsten. Specifically, a narrow serpentine of tungsten paste is deposited on the top of ceramic substrate 106, such as by using a silk screen process. The tungsten paste is hardened when the ceramic substrate is baked in an oven, thereby forming resistive heater 110.

As discussed above, the use of an integrated heater element in an image sensor integrated circuit package provides many advantages. Importantly, by using an area heater element placed in close proximity to the sensor to be heated, uniform heating of the active sensor can be realized. Conventional package heating methods are not desirable as they often result in a temperature gradient and thus non-uniform heating. Moreover, the heater element of the present invention consumes little power and can be operated from a 3.3 Volt power supply voltage consuming about 1 Watt of power.

According to an alternate embodiment of the present invention, a heat spreader may be integrated into the image sensor integrated circuit package of the present invention to further improve heating uniformity. The heat spreader can be formed in the substrate of the package in the form of a power plane.

According to another embodiment of the present invention, close loop regulation of the heating temperature is provided by using data readout from the image sensor chip to maintain a constant heating temperature of the heater element. In one embodiment, the dark current value from the image sensor chip is used as a measure of the chip temperature. Dark current refers to the leakage current from the "dark" photosensitive elements of the sensor chip where the "dark" photosensitive elements are covered and not exposed to light. It is well understood that such dark current has a known temperature dependent characteristic. In operation, the dark current value is measured and the current chip temperature is determined. The dark current value is then used to implement a close loop regulation of the heating temperature of the heater element.

The above detailed descriptions are provided to illustrate specific embodiments of the present invention and are not intended to be limiting. Numerous modifications and variations within the scope of the present invention are possible. The present invention is defined by the appended claims.

I claim:

1. An integrated circuit package for an image sensor chip, the image sensor chip including a sensor area for sensing incident light and a circuitry area, the package comprising:

a substrate including a first surface for receiving an image sensor chip and a second surface having an array of contact terminals formed thereon; and a heater element having a first terminal and a second terminal coupled to a first contact terminal and a second contact terminal, respectively, of the array of contact terminals, the heater element being positioned on the first surface of the substrate and directly underneath the sensor area of the image sensor chip to be assembled in the package, the image sensor chip to be placed directly on the heater element, wherein the heater element provides heating of the sensor area of the image sensor chip when a first voltage is applied across the first contact terminal and the second contact terminal; and wherein the image sensor chip is attached directly to the heater element and the first surface of the substrate using an epoxy glue so that the heater element is sandwiched directly between the sensor area of the image sensor chip and the first surface of the substrate to provide direct and localized heating of the sensor area of the image sensor chip.

2. The integrated circuit package of claim 1, wherein the package comprises a ball grid array package and the array of contact terminals comprises an array of contact balls.

3. The integrated circuit package of claim 1, wherein the package comprises a land grid array package and the array of contact terminals comprises an array of contact pads.

4. The integrated circuit package of claim 1, wherein the package comprises a pin grid array package and the array of contact terminals comprises an array of contact pins.

5. The integrated circuit package of claim 1, wherein the package comprises a ceramic or plastic leaded chip carrier and the array of contact terminals comprises an array of contact pins formed on the side surfaces of the package.

6. The integrated circuit package of claim 1, wherein the heater element comprises a resistive heater element.

7. The integrated circuit package of claim 6, wherein the resistive heater element comprises a material selected from conductive plastic and conductive metals.

8. The integrated circuit package of claim 6, wherein the resistive heater element comprises tungsten formed in a narrow serpentine shape.

9. The integrated circuit package of claim 6, wherein the first terminal of the heater element is connected to the first contact terminal through a first via interconnect through the substrate of the package and the second terminal of the heater element is connected to the second contact terminal through a second via interconnect through the substrate of the package.

10. The integrated circuit package of claim 1, further comprising a protection resistor coupled between the first terminal and the second terminal of the heater element.

11. The integrated circuit package of claim 10, wherein the protection resistor comprises a high resistance resistor.

12. The integrated circuit package of claim 11, wherein the resistance of the protection resistor is about 100 Ohms or greater.

13. The integrated circuit package of claim 1, further comprising a heat spreader formed in the substrate.

* * * * *